(12) United States Patent
Holliday et al.

(10) Patent No.: US 8,897,040 B2
(45) Date of Patent: Nov. 25, 2014

(54) POWER CONVERTER SYSTEMS AND METHODS OF OPERATING A POWER CONVERTER SYSTEM

(75) Inventors: Cornelius Edward Holliday, Forest, VA (US); Huibin Zhu, Westford, MA (US); Robert Gregory Wagoner, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 235 days.

(21) Appl. No.: 13/279,424

(22) Filed: Oct. 24, 2011

(65) Prior Publication Data

US 2013/0100720 A1    Apr. 25, 2013

(51) Int. Cl.
 H02M 5/45      (2006.01)
 H02M 5/458     (2006.01)
 H02H 7/122     (2006.01)
 H02H 9/04      (2006.01)

(52) U.S. Cl.
 CPC .................................. *H02H 9/04* (2013.01)
 USPC ........................................ 363/37; 363/56.02

(58) Field of Classification Search
 USPC ............ 323/274, 284; 363/34, 35, 37, 51–55, 363/56.01, 56.02, 56.05, 56.11
 See application file for complete search history.

(56) References Cited

U.S. PATENT DOCUMENTS

| | | | |
|---|---|---|---|
| 4,788,485 A * | 11/1988 | Kawagishi et al. | 318/811 |
| 4,843,533 A * | 6/1989 | Roof et al. | 363/55 |
| 5,170,105 A | 12/1992 | Kumar | |
| 5,396,214 A | 3/1995 | Kumar | |
| 5,465,202 A * | 11/1995 | Ibori et al. | 363/37 |
| 5,982,136 A * | 11/1999 | Pelly | 318/801 |
| 6,043,996 A * | 3/2000 | Kumar | 363/41 |
| 6,058,031 A | 5/2000 | Lyons et al. | |
| 6,172,429 B1 | 1/2001 | Russell | |
| 6,291,764 B1 | 9/2001 | Ishida et al. | |
| 7,339,287 B2 | 3/2008 | Jepsen et al. | |
| 7,586,216 B2 | 9/2009 | Li et al. | |
| 7,952,331 B2 | 5/2011 | Anghel et al. | |
| 8,004,252 B2 | 8/2011 | Sihler et al. | |
| 8,050,062 B2 * | 11/2011 | Wagoner et al. | 363/49 |
| 2008/0094864 A1 * | 4/2008 | Sekimoto et al. | 363/36 |
| 2008/0094867 A1 | 4/2008 | Muller et al. | |

\* cited by examiner

*Primary Examiner* — Adolf Berhane
*Assistant Examiner* — Gary Nash
(74) *Attorney, Agent, or Firm* — James McGinness, Esq.; Armstrong Teasdale LLP

(57) ABSTRACT

A power converter system includes a converter, a DC link, an inverter, a damping circuit, and a control system. The converter includes an input to couple to a power generation unit and an output to provide a direct current (DC) DC power output. The DC link includes a capacitor coupled to the converter output. A voltage across the capacitor defines a DC link voltage. The inverter includes an input coupled to the DC link. The damping circuit is coupled between the converter and the inverter in parallel with the DC link capacitor. The damping circuit includes a normally closed switching device, and a resistor coupled in series with the normally closed switching device. The control system is coupled to the damping circuit and configured to control the normally closed switching device as a function of at least one operating parameter of the power converter system.

15 Claims, 2 Drawing Sheets

POWER CONVERTER SYSTEMS AND METHODS OF OPERATING A POWER CONVERTER SYSTEM

BACKGROUND OF THE INVENTION

The subject matter described herein relates generally to power systems and, more particularly, to a power converter system and methods of operating the power converter system.

In some known solar power systems, a plurality of photovoltaic panels (also known as solar panels) are logically or physically grouped together to form an array of solar panels. The solar panel array converts solar energy into electrical energy and transmits the energy to an electrical grid or other destination.

Solar panels generally output direct current (DC) electrical power. To properly couple such solar panels to an electrical grid, the electrical power received from the solar panels is converted to alternating current (AC). At least some known power systems use a power converter to convert DC power to AC power. In certain situations, such as during startup of the power converter and/or during a fault in electrical grid, less than all of the available energy within the converter may be delivered to the electrical grid. In such situations, voltages within the converter may increase to levels dangerous to the health of the converter.

BRIEF DESCRIPTION OF THE INVENTION

In one embodiment, a power converter system includes a converter, a DC link, an inverter, a damping circuit, and a control system. The converter includes an input to couple to a power generation unit and an output to provide a direct current (DC) DC power output. The DC link includes a capacitor coupled to the converter output. A voltage across the capacitor defines a DC link voltage. The inverter includes an input coupled to the DC link. The damping circuit is coupled between the converter and the inverter in parallel with the DC link capacitor. The damping circuit includes a normally closed switching device, and a resistor coupled in series with the normally closed switching device. The control system is coupled to the damping circuit and configured to control the normally closed switching device as a function of at least one operating parameter of the power converter system.

In another embodiment, a method of operating a power converter system includes coupling electrical energy from a solar panel array to a power converter. The power converter includes a first converter stage, a second converter stage, a direct current (DC) link including a capacitor, and a damping circuit coupled in parallel with the capacitor. The method includes selectively dissipating at least a portion of the energy in the DC link through the damping circuit as a function of a power output of the power converter.

In yet another embodiment, a two-stage, direct current to alternating current (DC/AC) power converter system is described. The power converter system includes a first converter stage configured to be coupled to a power generation unit to receive direct current (DC) power from the power generation unit. A DC link includes a capacitor coupled to the first converter stage. A DC link voltage is generated across the capacitor when electricity is conducted through the power converter system. The power converter system includes a damping circuit coupled across the capacitor and a second converter stage coupled to the DC link and configured to output alternating current (AC) power. A controller is coupled to the damping circuit and is configured to selectively dissipate at least a portion of the energy in the DC link through the damping circuit as a function of a power output of the second converter stage to limit a magnitude of the DC link voltage.

DETAILED DESCRIPTION OF THE INVENTION

Figure 1:
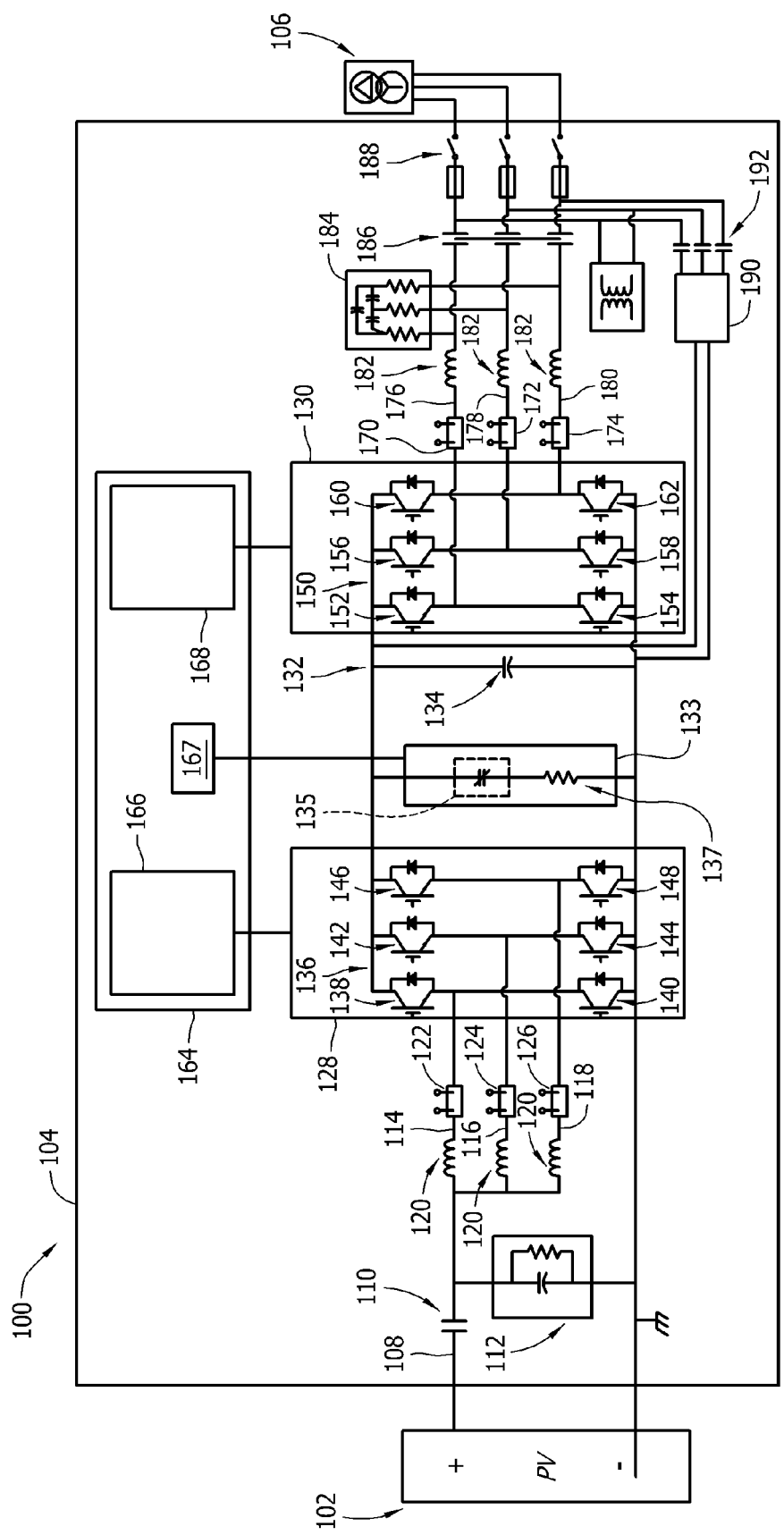
FIG. 1 is a schematic diagram of an exemplary power generation system.

FIG. 1 is a schematic diagram of an exemplary power generation system 100 that includes a plurality of power generation units, such as a plurality of solar panels (not shown) that form at least one solar array 102. Alternatively, power generation system 100 includes any suitable number and type of power generation units, such as a plurality of wind turbines, fuel cells, geothermal generators, hydropower generators, and/or other devices that generate power from renewable and/or non-renewable energy sources.

In the exemplary embodiment, power generation system 100 and/or solar array 102 includes any number of solar panels to facilitate operating power generation system 100 at a desired power output. In one embodiment, power generation system 100 includes a plurality of solar panels and/or solar arrays 102 coupled together in a series-parallel configuration to facilitate generating a desired current and/or voltage output from power generation system 100. Solar panels include, in one embodiment, one or more of a photovoltaic panel, a solar thermal collector, or any other device that converts solar energy to electrical energy. In the exemplary embodiment, each solar panel is a photovoltaic panel that generates a substantially direct current (DC) power as a result of solar energy striking solar panels.

In the exemplary embodiment, solar array 102 is coupled to a power converter 104, or a power converter system 104, that converts the DC power to alternating current (AC) power. The AC power is transmitted to an electrical distribution network 106, or "grid." Power converter 104, in the exemplary embodiment, adjusts an amplitude of the voltage and/or current of the converted AC power to an amplitude suitable for electrical distribution network 106, and provides AC power at a frequency and a phase that are substantially equal to the frequency and phase of electrical distribution network 106. Moreover, in the exemplary embodiment, power converter 104 provides three phase AC power to electrical distribution network 106. Alternatively, power converter 104 provides single phase AC power or any other number of phases of AC power to electrical distribution network 106.

DC power generated by solar array 102, in the exemplary embodiment, is transmitted through a converter conductor 108 coupled to power converter 104. In the exemplary embodiment, a protection device 110 electrically disconnects solar array 102 from power converter 104, for example, if an error or a fault occurs within power generation system 100. Current protection device 110 is a circuit breaker, a fuse, a contactor, and/or any other device that enables solar array 102 to be controllably disconnected from power converter 104. A DC filter 112 is coupled to converter conductor 108 for use in filtering an input voltage and/or current received from solar array 102.

Converter conductor 108, in the exemplary embodiment, is coupled to a first input conductor 114, a second input conductor 116, and a third input conductor 118 such that the input current is split between first, second, and third input conductors 114, 116, and 118. Alternatively, the input current may be conducted to a single conductor, such as converter conductor 108, and/or to any other number of conductors that enables power generation system 100 to function as described herein. At least one boost inductor 120 is coupled to each of first input conductor 114, second input conductor 116, and/or third input conductor 118. Boost inductors 120 facilitate filtering the input voltage and/or current received from solar array 102. In addition, at least a portion of the energy received from solar array 102 is temporarily stored within each boost inductor 120.

In the exemplary embodiment, a first input current sensor 122 is coupled to first input conductor 114, a second input current sensor 124 is coupled to second input conductor 116, and a third input current sensor 126 is coupled to third input conductor 118. First, second, and third input current sensors 122, 124, and 126 measure the current flowing through first, second, and third input conductors 114, 116, and 118, respectively.

In the exemplary embodiment, power converter 104 is a two-stage power converter. Power converter 104 includes a DC to DC, or "boost," converter 128 as a first stage and an inverter 130 as a second stage. Boost converter 128 and inverter 130 are coupled together by a DC bus 132 (also referred to sometimes as a DC link). Boost converter 128, in the exemplary embodiment, is coupled to, and receives DC power from, solar array 102 through first, second, and third input conductors 114, 116, and 118. Moreover, boost converter 128 adjusts the voltage and/or current amplitude of the DC power received. In the exemplary embodiment, inverter 130 is a DC-AC inverter that converts DC power received from boost converter 128, via DC bus 132, into AC power for transmission to electrical distribution network 106. Moreover, in the exemplary embodiment, DC bus 132 includes at least one capacitor 134. Alternatively, DC bus 132 includes a plurality of capacitors 134 and/or any other electrical power storage devices that enable power converter 104 to function as described herein. As current is transmitted through power converter 104, a voltage is generated across DC bus 132 and energy is stored within capacitors 134.

A damping circuit 133 is coupled to DC bus 132. In the exemplary embodiment, damping circuit 133 is coupled in parallel with capacitor 134. Damping circuit 133 is configured for selective dissipation of energy in DC bus 132. Moreover, damping circuit 133 selectively dissipates at least a portion of the energy in DC bus 132 to facilitate limiting a magnitude of a DC bus voltage in DC bus 132. In some embodiments, the damping provided by damping circuit 133 additionally, or alternatively, enhances stability of power converter 104, in general, and the voltage on DC bus 132, specifically.

In the exemplary embodiment, damping circuit 133 includes a normally-closed (NC) switch 135 coupled in series with a damping resistor 137. When a control signal is applied to NC switch 135, it opens and prevents the flow of current through NC switch 135 and resistor 137. In the absence of any control signal, NC switch 135 is closed and operable to conduct current through NC switch 135 and resistor 137 to dissipate energy in DC bus 132. In other embodiments damping circuit 133 includes a normally-open switch rather than NC switch 135. In some embodiments, NC switch 135 is a normally open switch controlled to operate as a normally-closed switch. Moreover in some embodiments, damping circuit 133 includes reactive components (e.g., capacitive and/or inductive components) in addition to damping resistor 137. NC switch 135 may be any suitable switch, whether mechanical, electrical, or electro-mechanical, operable as described herein including, for example, a depletion mode field effect transistor, a contactor, etc.

Boost converter 128, in the exemplary embodiment, includes two converter switches 136 coupled together in serial arrangement for each phase of electrical power that power converter 104 produces. In the exemplary embodiment, converter switches 136 are insulated gate bipolar transistors (IGBTs). Alternatively, converter switches 136 are any other suitable transistor or any other suitable switching device. Moreover, each pair of converter switches 136 for each phase is coupled in parallel with each pair of converter switches 136 for each other phase. As such, for a three phase power converter 104, boost converter 128 includes a first converter switch 138 coupled in series with a second converter switch 140, a third converter switch 142 coupled in series with a fourth converter switch 144, and a fifth converter switch 146 coupled in series with a sixth converter switch 148. First and second converter switches 138 and 140 are coupled in parallel with third and fourth converter switches 142 and 144, and with fifth and sixth converter switches 146 and 148. Alternatively, boost converter 128 may include any suitable number of converter switches 136 arranged in any suitable configuration.

Inverter 130, in the exemplary embodiment, includes two inverter switches 150 coupled together in serial arrangement for each phase of electrical power that power converter 104 produces. In the exemplary embodiment, inverter switches 150 are insulated gate bipolar transistors (IGBTs). Alternatively, inverter switches 150 are any other suitable transistor or any other suitable switching device. Moreover, each pair of inverter switches 150 for each phase is coupled in parallel with each pair of inverter switches 150 for each other phase. As such, for a three phase power converter 104, inverter 130 includes a first inverter switch 152 coupled in series with a second inverter switch 154, a third inverter switch 156 coupled in series with a fourth inverter switch 158, and a fifth inverter switch 160 coupled in series with a sixth inverter switch 162. First and second inverter switches 152 and 154 are coupled in parallel with third and fourth inverter switches 156 and 158, and with fifth and sixth inverter switches 160 and 162. Alternatively, inverter 130 may include any suitable number of inverter switches 150 arranged in any suitable configuration.

Power converter 104 includes a control system 164 that includes a converter controller 166, a damping controller 167, and an inverter controller 168. Converter controller 166 is coupled to, and controls an operation of, boost converter 128. More specifically, in the exemplary embodiment, converter controller 166 operates boost converter 128 to maximize the power received from solar array 102. Damping controller 167 is coupled to, and controls an operation of, damping circuit 133. More specifically, in the exemplary embodiment, damping controller 167 selectively operates damping circuit 133 to dissipate at least a portion of the energy in DC bus 132. Even more specifically, damping controller 167 selectively operates NC switch 135 to dissipate energy in DC bus 132 to limit the magnitude of the voltage on DC bus 132. Inverter controller 168 is coupled to, and controls the operation of, inverter 130. More specifically, in the exemplary embodiment, inverter controller 168 operates inverter 130 to regulate the voltage across DC bus 132 and/or to adjust the voltage, current, phase, frequency, and/or any other characteristic of the power output from inverter 130 to substantially match the characteristics of electrical distribution network 106.

In the exemplary embodiment control system 164, converter controller 166, damping controller 167, and/or inverter controller 168 include and/or are implemented by at least one processor. As used herein, the processor includes any suitable programmable circuit such as, without limitation, one or more systems and microcontrollers, microprocessors, reduced instruction set circuits (RISC), application specific integrated circuits (ASIC), programmable logic circuits (PLC), field programmable gate arrays (FPGA), and/or any other circuit capable of executing the functions described herein. The above examples are exemplary only, and thus are not intended to limit in any way the definition and/or meaning of the term "processor." In addition, control system 164, converter controller 166, damping controller 167, and/or inverter controller 168 include at least one memory device (not shown) that stores computer-executable instructions and data, such as operating data, parameters, setpoints, threshold values, and/or any other data that enables control system 164 to function as described herein.

Converter controller 166, in the exemplary embodiment, receives current measurements from first input current sensor 122, second input current sensor 124, and/or third input current sensor 126. Moreover, converter controller 166 receives measurements of a voltage of first input conductor 114, second input conductor 116, and/or third input conductor 118 from a plurality of input voltage sensors (not shown). Inverter controller 168, in the exemplary embodiment, receives current measurements from a first output current sensor 170, a second output current sensor 172, and/or a third output current sensor 174. Moreover, inverter controller 168 receives measurements of a voltage output from inverter 130 from a plurality of output voltage sensors (not shown). In the exemplary embodiment, converter controller 166, damping controller 167, and/or inverter controller 168 receive voltage measurements of the voltage of DC bus 132 from a DC bus voltage sensor (not shown). Moreover, damping controller 167, in the exemplary embodiment, may receive signals indicative of the power output of inverter 130 from inverter controller 168, from output current sensors 170-174, and/or from a plurality of output voltage sensors (not shown). In some embodiments, damping controller monitors the condition of electric distribution network 106, such as via sensors (not shown) coupled to monitor the current and voltage of electric distribution network.

In the exemplary embodiment, inverter 130 is coupled to electrical distribution network 106 by a first output conductor 176, a second output conductor 178, and a third output conductor 180. Moreover, in the exemplary embodiment, inverter 130 provides a first phase of AC power to electrical distribution network 106 through first output conductor 176, a second phase of AC power to electrical distribution network 106 through second output conductor 178, and a third phase of AC power to electrical distribution network 106 through third output conductor 180. First output current sensor 170 is coupled to first output conductor 176 for measuring the current flowing through first output conductor 176. Second output current sensor 172 is coupled to second output conductor 178 for measuring the current flowing through second output conductor 178, and third output current sensor 174 is coupled to third output conductor 180 for measuring the current flowing through third output conductor 180.

At least one inductor 182 is coupled to each of first output conductor 176, second output conductor 178, and/or third output conductor 180. Inductors 182 facilitate filtering the output voltage and/or current received from inverter 130. Moreover, in the exemplary embodiment, an AC filter 184 is coupled to first output conductor 176, second output conductor 178, and/or third output conductor 180 for use in filtering an output voltage and/or current received from conductors 176, 178, and 180.

In the exemplary embodiment, at least one contactor 186 and/or at least one disconnect switch 188 are coupled to first output conductor 176, second output conductor 178, and/or third output conductor 180. Contactors 186 and disconnect switches 188 electrically disconnect inverter 130 from electrical distribution network 106, for example, if an error or a fault occurs within power generation system 100. Moreover, in the exemplary embodiment, protection device 110, contactors 186 and disconnect switches 188 are controlled by control system 164. Alternatively, protection device 110, contactors 186 and/or disconnect switches 188 are controlled by any other system that enables power converter 104 to function as described herein.

Power converter 104 also includes a bus charger 190 that is coupled to first output conductor 176, second output conductor 178, third output conductor 180, and to DC bus 132. In the exemplary embodiment, at least one charger contactor 192 is coupled to bus charger 190 for use in electrically disconnecting bus charger 190 from first output conductor 176, second output conductor 178, and/or third output conductor 180. Moreover, in the exemplary embodiment, bus charger 190 and/or charger contactors 192 are controlled by control system 164 for use in charging DC bus 132 to a predetermined voltage.

During operation, in the exemplary embodiment, solar array 102 generates DC power and transmits the DC power to boost converter 128. Converter controller 166 controls a switching of converter switches 136 to adjust an output of boost converter 128. More specifically, in the exemplary embodiment, converter controller 166 controls the switching of converter switches 136 to adjust the voltage and/or current received from solar array 102 such that the power received from solar array 102 is increased and/or maximized.

Inverter controller 168, in the exemplary embodiment, controls a switching of inverter switches 150 to adjust an output of inverter 130. More specifically, in the exemplary embodiment, inverter controller 168 uses a suitable control algorithm, such as pulse width modulation (PWM) and/or any other control algorithm, to transform the DC power received from boost converter 128 into three phase AC power signals. Alternatively, inverter controller 168 causes inverter 130 to transform the DC power into a single phase AC power signal or any other signal that enables power converter 104 to function as described herein.

In the exemplary embodiment, each phase of the AC power is filtered by AC filter 184, and the filtered three phase AC power is transmitted to electrical distribution network 106. In the exemplary embodiment, three phase AC power is also transmitted from electrical distribution network 106 to DC bus 132 by bus charger 190. In one embodiment, bus charger 190 uses the AC power to charge DC bus 132 to a suitable voltage amplitude, for example, during a startup and/or a shutdown sequence of power converter 104.

Figure 2:
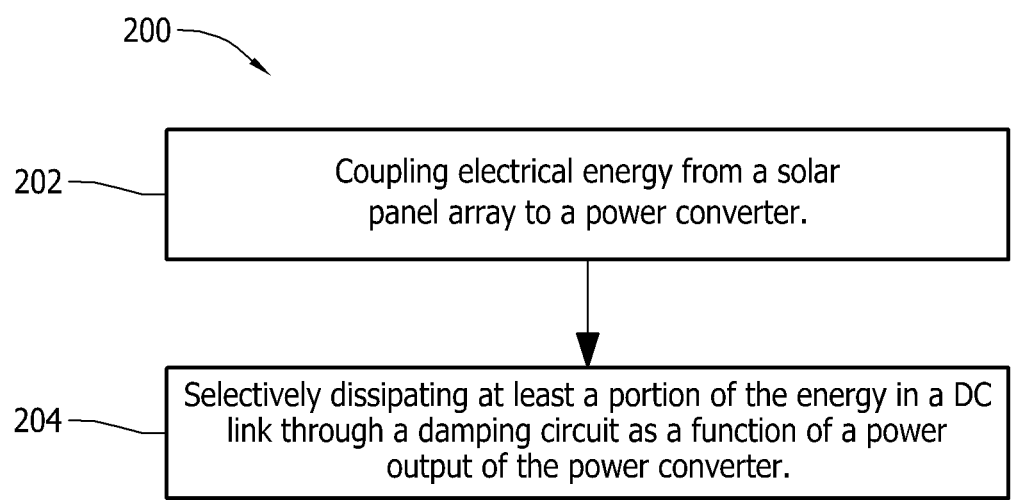
FIG. 2 is a flow diagram of an exemplary method of operating a power converter system.

FIG. 2 is a flow diagram of an exemplary method 200 of operating power converter 104 (shown in FIG. 1). In the exemplary embodiment, method 200 is implemented by control system 164, such as by converter controller 166, damping controller 167, and/or inverter controller 168 (all shown in FIG. 1). Alternatively, method 200 may be implemented by any other system that enables power converter 104 to function as described herein.

When method 200 is executed, electrical energy is coupled 202 from solar array 102 to converter 104. At least a portion of the energy in DC bus 132 is selectively dissipated 204 through damping circuit 133.

Damping controller 167 selectively dissipates energy from DC bus 132 by selectively controlling NC switch 135. When NC switch 135 is closed, current flows through NC switch 135 and damping resistor 137 to dissipate some of the energy in DC bus 132. When NC switch 135 is opened, current does not flow through NC switch 135 and damping resistor 137. Thus, when NC switch 135 is opened, energy is not dissipated from DC bus 132 and damping circuit 133 is functionally removed from converter 104.

In the exemplary embodiment, damping controller 167 selectively dissipates energy from DC bus 132 as a function of a power output of power converter 104. More specifically, damping controller 167 selectively dissipates energy from DC bus 132 as a function of a power output of inverter 130. When the power output of inverter 130 is less than a threshold value, damping controller 167 closes, or allows to remain closed, NC switch 135. Thus, when the output power of inverter 130 is below the threshold value, damping controller 167 dissipates at least part of the energy in DC bus 132 to facilitate maintaining the voltage on DC bus 132 at a desired level. In other embodiments, damping controller 167 selectively dissipates energy from DC bus 132 as a function of a magnitude of a voltage. The voltage may be the DC bus 132 voltage, an output voltage of converter 104, or any other suitable voltage. Thus, for example, in some embodiments damping controller 167 monitors the voltage on DC bus 132 and closes NC switch 135 when the voltage on DC bus 132 exceeds a threshold value. In other embodiments, damping controller 167 selectively dissipates energy from DC bus 132 as a function of a current. The current may be a current through DC bus 132, an output current of converter 104, or any other suitable current. In some embodiments, for example, damping controller 167 monitors the current through DC bus 132 and closes NC switch 135 when the current is less than a threshold value. In still other embodiments, damping controller 167 selectively dissipates energy from DC bus 132 as a function of at least one characteristic or condition of electrical distribution network 106. In one such embodiment, damping controller 167 monitors the electric distribution network 106 and dissipates energy through damping circuit 133 upon detecting a fault in electric distribution network 106, whether or not the fault has yet affected converter 104. In yet other embodiments, damping controller 167 selectively dissipates energy from DC bus 132 as a function of the stability of converter 104. Damping controller 167 monitors one or more operating parameters of converter 104, and estimates and/or predicts the stability of converter 104. If damping controller 167 determines converter 104 is unstable, or may become unstable, it dissipates at least some energy in DC bus 132 through damping circuit 133 to facilitate minimizing instability of converter 104. Although described separately above, damping controller 167 may dissipate energy through damping circuit 133 as a function of more than one parameter described above and/or to achieve more than one result.

In the exemplary embodiment, damping controller 167 is configured to maintain NC switch 135 in a closed state during startup of converter 104. On startup of converter 104, converter 104 begins converting power received from solar array 102 to AC power for electric distribution network 106. Inverter 130 may be unable to immediately output all of the power that boost converter 128 produces during startup. Damping controller 167 dissipates at least some of the energy in DC bus 132 through damping circuit 133, to prevent the voltage on DC bus 132 from increasing beyond a desired level. The enablement of damping circuit 133 during startup may be part of the same control that dissipates energy from DC bus 132 as a function of other parameters, or startup may itself be a separate parameter.

If control system 164 or damping controller 167 were to fail (e.g., due to power failure, physical damage, short circuiting, etc.), damping circuit 133 is, in the exemplary embodiment, automatically engaged. Because of the normally-closed control of NC switch 135, in the event of a failure, NC switch 135 will close and energy in DC bus 132 will be dissipated through damping circuit 133. Moreover, in some embodiments, bus capacitor 134 may be discharged through damping circuit 133. Thus, damping circuit 133 may provide an additional failsafe for converter 104.

The above-described embodiments facilitate safe, efficient, and stabile operation of a power converter. The power converter includes a damping circuit selectively operable to dissipate energy in a DC bus of the power converter, which limits the voltage on the DC bus of a converter. Thus, components rated for lower voltages and/or currents may be utilized in the converter, resulting in a cost and/or space savings. Moreover, because the voltage on the DC bus is limited by the damping circuit, the power converter is likely to be more stable and experience fewer tripping events. Additionally, at least some of the methods and systems described herein utilize a normally closed switch in the damping circuit. The normally closed switch closes, thereby engaging or enabling the damping circuit, in the absence of a control signal. Accordingly, if there is a control system error or failure, the damping circuit will automatically be enabled and energy will be dissipated from the DC bus through the damping circuit.

A technical effect of the systems and methods described herein includes at least one of: (a) coupling electrical energy from a solar panel array to a power converter including a first converter stage, a second converter stage, a DC link including a capacitor, and a damping circuit coupled in parallel with the capacitor; and (b) selectively dissipating at least a portion of the energy in the DC link through the damping circuit as a function of a power output of the power converter.

Exemplary embodiments of a power converter system and methods for operating a power converter system are described above in detail. The power converter system and methods are not limited to the specific embodiments described herein, but rather, components of the power converter system and/or steps of the methods may be utilized independently and separately from other components and/or steps described herein. For example, the power converter system may also be used in combination with other power generation systems and methods, and is not limited to practice with only the solar power system as described herein. Rather, the exemplary embodiment can be implemented and utilized in connection with many other renewable energy and/or power generation applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power converter system comprising:
   a converter comprising an input to couple to a power generation unit and an output to provide a direct current (DC) power output;
   a DC link comprising a capacitor coupled to said converter output and having a voltage across said capacitor defining a DC link voltage;
   an inverter comprising an input coupled to said DC link;
   a damping circuit coupled between said converter and said inverter in parallel with said DC link capacitor, said damping circuit comprising:
      a normally closed switching device; and,
      a resistor coupled in series with said normally closed switching device; and,
   a control system coupled to said damping circuit, said control system configured to control said normally closed switching device to selectively dissipate energy from said DC link as a function of at least one of an output power of said inverter, an output current of said inverter, and a magnitude of the DC link voltage, wherein:
      said control system is configured to limit the magnitude of the DC link voltage through controlling said normally closed switching device; and
      said control system is configured to monitor the output current of said inverter and close said normally closed switch when the monitored output current decreases below a threshold value.

2. A power converter in accordance with claim 1, wherein said control system is further configured to maintain said normally closed switching device in a closed state during at least a portion of a startup time of said power converter system.

3. A power converter in accordance with claim 1, wherein said control system is coupled to said inverter, and said control system is further configured to control said normally closed switching device to limit the magnitude of the DC link voltage as a function of an output of said inverter.

4. A power converter in accordance with claim 3, wherein said control system is further configured to monitor the output power of said inverter and control said normally closed switching device as a function of the output power of said inverter.

5. A power converter in accordance with claim 4, wherein said control system is further configured to open said normally closed switching device when the output power of said inverter exceeds a threshold value.

6. A power converter in accordance with claim 5, wherein said control system is further configured to close said normally closed switching device when the output power of said inverter decreases below a threshold value.

7. A power converter in accordance with claim 4, wherein said control system is further configured to maintain said normally closed switching device in a closed state when the output power of said inverter is below a threshold value.

8. A power converter in accordance with claim 1, wherein said control system is further configured to monitor the DC link voltage and close said normally closed switching device when the magnitude of the DC link voltage exceeds a threshold value.

9. A power converter in accordance with claim 1, wherein said control system is further configured to estimate a stability of said power converter and control said normally closed switching device to increase the stability of said power converter.

10. A method of operating a power converter system, said method comprising:
    coupling electrical energy from a solar panel array to a power converter including a first converter stage, a second converter stage, a direct current (DC) link including a capacitor, and a damping circuit coupled in parallel with the capacitor, wherein the damping circuit comprises a normally closed switch coupled in series with a resistor; and,
    selectively dissipating at least a portion of the energy in the DC link through the damping circuit as a function of a power output of the power converter by selectively operating the normally closed switch as a function of the power output of the power converter, wherein said selectively dissipating at least a portion of the energy in the DC link comprises not dissipating energy through the damping circuit when the power output of the power converter exceeds a threshold value.

11. A method in accordance with claim 10, wherein said selectively dissipating at least a portion of the energy in the DC link through the damping circuit as a function of a power output of the power converter further comprises dissipating energy through the damping circuit when the power output of the power converter is less than the threshold value.

12. A two-stage, direct current to alternating current (DC/AC) power converter system comprising:
    a first converter stage configured to be coupled to a power generation unit to receive direct current (DC) power from the power generation unit;
    a DC link comprising a capacitor coupled to said first converter stage, wherein a DC link voltage is generated across said capacitor when electricity is conducted through said power converter system;
    a damping circuit coupled across said capacitor;
    a second converter stage coupled to said DC link and configured to output alternating current (AC) power; and,
    a controller coupled to said damping circuit and configured to control said damping circuit to:
       selectively dissipate at least a portion of the energy in said DC link through said damping circuit as a function of a power output of said second converter stage to limit a magnitude of the DC link voltage; and
       not dissipate energy through said damping circuit when the power output of said second converter stage exceeds a threshold value.

13. A converter system in accordance with claim 12, wherein said controller is further configured to dissipate energy through said damping circuit when the power output of said inverter is less than the threshold value.

14. A converter system in accordance with claim 13, wherein said controller is further configured to dissipate energy through said damping circuit during startup of said power converter system until the power output of said second stage exceeds a threshold.

15. A converter system in accordance with claim 12, wherein said damping circuit comprises a normally closed switch coupled in series with a resistor, and wherein said controller is further configured to selectively dissipate at least a portion of the energy in said DC link through said damping circuit by selectively operating said normally closed switch as a function of the power output of said inverter.

* * * * *